(12) United States Patent
Karkheck et al.

(10) Patent No.: US 11,492,774 B2
(45) Date of Patent: Nov. 8, 2022

(54) SYSTEMS, METHODS AND MACHINES FOR DRIVING SCREW ANCHORS

(71) Applicant: Ojjo, Inc., San Rafael, CA (US)

(72) Inventors: Johann Karkheck, Petaluma, CA (US); Tyrus Hudson, Petaluma, CA (US); Charles Almy, Berkeley, CA (US); Jack West, San Rafael, CA (US)

(73) Assignee: Ojjo, Inc., San Rafael, CA (US)

( * ) Notice: Subject to any disclaimer, the term of this patent is extended or adjusted under 35 U.S.C. 154(b) by 293 days.

(21) Appl. No.: 16/735,694

(22) Filed: Jan. 6, 2020

(65) Prior Publication Data

US 2020/0217034 A1    Jul. 9, 2020

Related U.S. Application Data

(60) Provisional application No. 62/793,331, filed on Jan. 16, 2019, provisional application No. 62/788,715, filed on Jan. 4, 2019.

(51) Int. Cl.
| | |
|---|---|
| *E02D 7/06* | (2006.01) |
| *E02D 7/22* | (2006.01) |
| *E02D 7/26* | (2006.01) |
| *E02D 27/16* | (2006.01) |
| *E02D 5/80* | (2006.01) |
| *E02D 27/50* | (2006.01) |
| *E02D 5/54* | (2006.01) |

(Continued)

(52) U.S. Cl.
CPC .................. *E02D 7/06* (2013.01); *E02D 7/22* (2013.01); *E02D 7/26* (2013.01); *E02D 27/16* (2013.01); *E02D 5/285* (2013.01); *E02D 5/54* (2013.01); *E02D 5/56* (2013.01); *E02D 5/801* (2013.01); *E02D 27/50* (2013.01)

(58) Field of Classification Search
CPC .... E02D 7/06; E02D 7/22; E02D 7/26; E02D 27/16; E02D 5/285; E02D 5/54; E02D 5/56; E02D 5/801; E02D 27/50
See application file for complete search history.

(56) References Cited

U.S. PATENT DOCUMENTS

| | | |
|---|---|---|
| 108,814 A | 11/1870 | Moseley |
| 3,300,988 A | 1/1967 | Phares et al. |

(Continued)

FOREIGN PATENT DOCUMENTS

| | | |
|---|---|---|
| EP | 0902128 | 3/1999 |
| GB | 219041 | 5/1983 |

(Continued)

OTHER PUBLICATIONS

Hercules Machine Corp., Self-contained Track Rig (STR) brochure, Dec. 1, 2015.

*Primary Examiner* — Benjamin F Fiorello
(74) *Attorney, Agent, or Firm* — Phillip D. Mancini

(57) ABSTRACT

A machine for driving a pair of screw anchors at substantially the same time. An attachment supports a pair of independent drive assemblies. Each assembly consists of a rotary driver and tool driver that moves along respective driving arms to independently drive a pair of screw anchors into supporting ground at different angles. Each assembly may move with respect to the machine independently to drive anchors into the ground in overlapping time, or both may rotate at once to drive anchors into the ground sequentially.

10 Claims, 14 Drawing Sheets

(51) Int. Cl.
  *E02D 5/28* (2006.01)
  *E02D 5/56* (2006.01)

(56) References Cited

U.S. PATENT DOCUMENTS

| | | | |
|---|---|---|---|
| 3,426,538 A | 2/1969 | Turzillo | |
| 3,464,216 A | 9/1969 | Turzillo | |
| 3,565,190 A | 2/1971 | Ishii | |
| 3,595,324 A | 7/1971 | Guild | |
| 3,604,214 A | 9/1971 | Turzillo | |
| 3,794,127 A | 2/1974 | Davis | |
| 3,938,344 A | 2/1976 | Asayama | |
| 3,971,177 A | 7/1976 | Endo | |
| 3,973,409 A | 8/1976 | Asayama | |
| 4,036,026 A | 7/1977 | Asayama | |
| 4,046,205 A | 9/1977 | Asayama | |
| 4,069,678 A * | 1/1978 | Miura | E02D 3/126 405/263 |
| 4,371,041 A | 2/1983 | Becker et al. | |
| 4,436,455 A | 3/1984 | Vance | |
| 4,441,557 A | 4/1984 | Zublin | |
| 4,467,575 A | 8/1984 | Dziedzic | |
| 4,537,536 A * | 8/1985 | Tsubonuma | E02D 5/18 405/240 |
| 4,595,059 A | 6/1986 | Katagiri et al. | |
| 4,697,648 A | 10/1987 | Brandt | |
| 4,761,098 A | 8/1988 | Lipsker | |
| 4,785,892 A | 11/1988 | Luen | |
| 4,907,915 A | 3/1990 | Nicholson et al. | |
| 4,974,997 A | 12/1990 | Sero et al. | |
| 5,002,435 A | 3/1991 | Dupeuble | |
| 5,348,424 A | 9/1994 | Tateyama et al. | |
| 5,423,636 A | 6/1995 | Mo | |
| 5,544,978 A | 8/1996 | Albers | |
| 5,607,261 A | 3/1997 | Odom et al. | |
| 5,738,465 A * | 4/1998 | Gessay | E02D 5/18 299/68 |
| 5,919,005 A | 7/1999 | Rupiper | |
| 5,934,836 A | 8/1999 | Rupiper et al. | |
| 6,000,154 A | 12/1999 | Berard et al. | |
| 6,216,803 B1 | 4/2001 | Deken | |
| 6,234,719 B1 | 5/2001 | Roynestad | |
| 6,641,332 B1 | 11/2003 | Alvarado | |
| 6,722,821 B1 | 4/2004 | Perko et al. | |
| 6,942,430 B1 | 9/2005 | Suver | |
| 7,387,173 B2 | 6/2008 | Jinnings et al. | |
| 7,621,098 B2 | 11/2009 | Reinert | |
| 7,854,451 B2 | 12/2010 | Davis, II | |
| 9,002,539 B2 | 4/2015 | Kaiser | |
| 9,057,169 B1 | 6/2015 | Perko | |
| 9,068,318 B1 | 6/2015 | Gochis | |
| 9,279,228 B1 | 3/2016 | Jinnings | |
| 9,416,512 B2 | 8/2016 | Suver | |
| 9,458,591 B1 | 10/2016 | Watson, III et al. | |
| 9,512,589 B1 | 12/2016 | Van Polen et al. | |
| 9,551,127 B1 | 1/2017 | Gochis | |
| 2005/0126821 A1 | 6/2005 | Davies | |
| 2009/0290940 A1 | 11/2009 | Martin, Sr. | |
| 2014/0140773 A1* | 5/2014 | Brown | E21D 20/028 405/259.5 |
| 2016/0348332 A1* | 12/2016 | Talbert | E02D 7/22 |

FOREIGN PATENT DOCUMENTS

| | | |
|---|---|---|
| JP | 2010037840 | 2/2010 |
| JP | 2010185204 | 8/2010 |
| JP | 2016079619 | 5/2016 |
| KR | 200285602 | 7/2002 |

* cited by examiner

SYSTEMS, METHODS AND MACHINES FOR DRIVING SCREW ANCHORS

CROSS-REFERENCE TO RELATED APPLICATIONS

This claims priority to U.S. provisional patent application Nos. 62/793,331 filed on Jan. 16, 2019, titled, "Mandrels and machines for driving foundation piles and related systems and methods," and 62/788,715 filed on Jan. 4, 2019, titled, "Solar pile driving machines and attachments and related methods of use," the disclosures of which are hereby incorporated by reference in their entirety.

BACKGROUND

Solar energy is one of Earth's largest potential sources of energy. Above the atmosphere, solar irradiance per unit area is 1.361 kilowatts per square meter. At sea level, the usable energy density is reduced to 250 watts per square meter. Using a two-dimensional model to approximate the Earth, 250 watts/square meter*$\pi$*6,371,000 meters$^2$ yields about 32,000 terra (trillion) watts of energy that continuously strikes Earth's surface. Assuming the sun continues to burn and emit photons for a billion more years, the survival of human life ultimately depends on harnessing this essentially unlimited, source of clean energy.

The main impediment to widescale solar adoption thus far has been cost. Unlike other energy sources, solar energy costs are frontloaded while the operating costs are comparatively low. Fossil fuel-based energy sources require up-front costs as well as pay-as-you-go costs from consuming fuel. Unfortunately, not all the ongoing costs are reflected in the price of energy generated from fossil-fuel sources. These "dirty" energy sources have significant external costs stemming from $CO_2$ emissions that, in the absence of a carbon tax, are not reflected in the cost. In addition, entrenched utilities and fossil fuel producers have lobbied effectively to stymie the progress of solar, even in states with the greatest solar potential.

Notwithstanding these headwinds, the cost of solar has now dropped low enough that even when coupled with energy storage, it is equivalent to or less expensive than coal, oil and even natural gas. In the context of the electricity market, the relative cost difference between competing sources is quantified in terms of the cost per unit, typically a kilowatt hour (kWh). Large scale solar arrays, so called "utility-scale" arrays, may have tens to hundreds of megawatts of power generating capacity, putting them on the same scale as small coal and natural gas-fueled power plants. These arrays usually generate power that is fed into the grid and sold at wholesale prices on the order of a few cents per kWh. The development of utility-scale solar projects is funded with so-called power purchase agreements (PPAs). With a PPA, an off taker (e.g., utility, grid operator, etc.) agrees to purchase all the power generated by the system at a fixed rate for the operational life of the array (e.g., 30 years). This enables a bank or other investor to accurately value the predicted future stream and to loan money against it to finance construction of the array.

Utility-scale solar power plants are predominantly configured as fixed-tilt ground mounted arrays or single-axis trackers. Fixed-tilt arrays are arranged in East-West oriented rows of panels tilted South at an angle dictated by the latitude of the array site—the further away from the equator, the steeper the tilt angle. By contrast, single-axis trackers are installed in North-South rows with the solar panels attached to a rotating axis called a torque tube that move the panels from an East-facing orientation to a West-facing orientation throughout the course of each day, following the sun's progression through the sky. For purposes of this disclosure, both fixed-tilt and single-axis trackers are referred to collectively as axial solar arrays.

Excluding land acquisitions costs, overall project costs for utility-scale arrays may include site preparation (road building, leveling, grid and water connections etc.), foundations, tracker or fixed-tilt hardware, solar panels, inverters and electrical connections (conduit, wiring, trenching, grid interface, etc.). Many of these costs have come down over the past few years due to ongoing innovation and economies of scale, however, one area that has been largely ignored is foundations. Foundations provide a uniform structural interface that couples the system to the ground. When installing a conventional single-axis tracker, after the site has been prepared, plumb monopiles are usually driven into the ground at regular intervals dictated by the tracker manufacturer and site plan; the tracker system components are subsequently attached to the head of those piles. Most often, the piles used to support the tracker have an H-shaped profile, but they may also be C-shaped or even box-shaped. In conventional, large-scale single-axis tracker arrays, the procurement and construction of the foundations may represent up to 5-10 percent of the total system cost. Despite this relatively small share of the total cost, any savings in steel and labor associated with foundations will amount to a significant amount of money over a large portfolio of solar projects. Also, tracker development deals are often locked-in a year or more before the installation costs are actually incurred, so any post-deal foundation savings that can be realized will be on top of the profits already factored in to calculations that supported the construction of the project.

One reason monopiles continue to dominate the market for single-axis tracker foundations is simplicity. It is relatively easy to drive monopiles into the ground along a straight line with existing technology, however, the design is inherently wasteful. The physics of a monopile mandates that it be oversized because single structural members are not good at resisting bending forces. When used to support a single-axis tracker, the largest forces on the foundation are not from the weight of the components, but rather the combined lateral force of wind striking the solar panels. This lateral force gets translated into the foundation as a bending moment. The magnitude of this force is much greater than the static loading attributable to the weight of the panels and tracker components. It acts like a lever arm trying to bend the pile, and the longer the lever arm, the greater the magnitude of the force. Many tracker companies specify a minimum foundation height of 40-inches or more. Therefore, in the context of single-axis trackers, monopile foundations must be oversized and driven deeply into the ground to withstand lateral loads.

The applicant of this disclosure has proposed a replacement to H-pile foundations that uses a pair of angled legs to form an A-frame-shaped truss foundation. Known commercially as EARTH TRUSS, each leg consists of a screw anchor driven substantially into the ground, and upper leg joined to the end of the screw anchor and an adapter or TRUSS CAP that joins the free end of each upper leg to unitize the structure. This configuration has the advantage of converting lateral loads into axial forces of tension and compression in the legs, rather than putting the foundation into bending. As a result of the more efficient distribution of lateral loads, the foundation may be constructed with less steel and driven to shallower depths than an equivalent H-pile foundation. However, in order to maximize its competitiveness relative to H-piles, EARTH TRUSS must similarly fast and easy to install. To that end, it is an object of this disclosure to provide machines and related systems and methods for installing screw anchors efficiently and consistently under a variety of soil and geologic conditions.

DETAILED DESCRIPTION

The following description is intended to convey a thorough understanding of the embodiments described by providing a number of specific embodiments and details involving A-frame foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

Figure 1A:
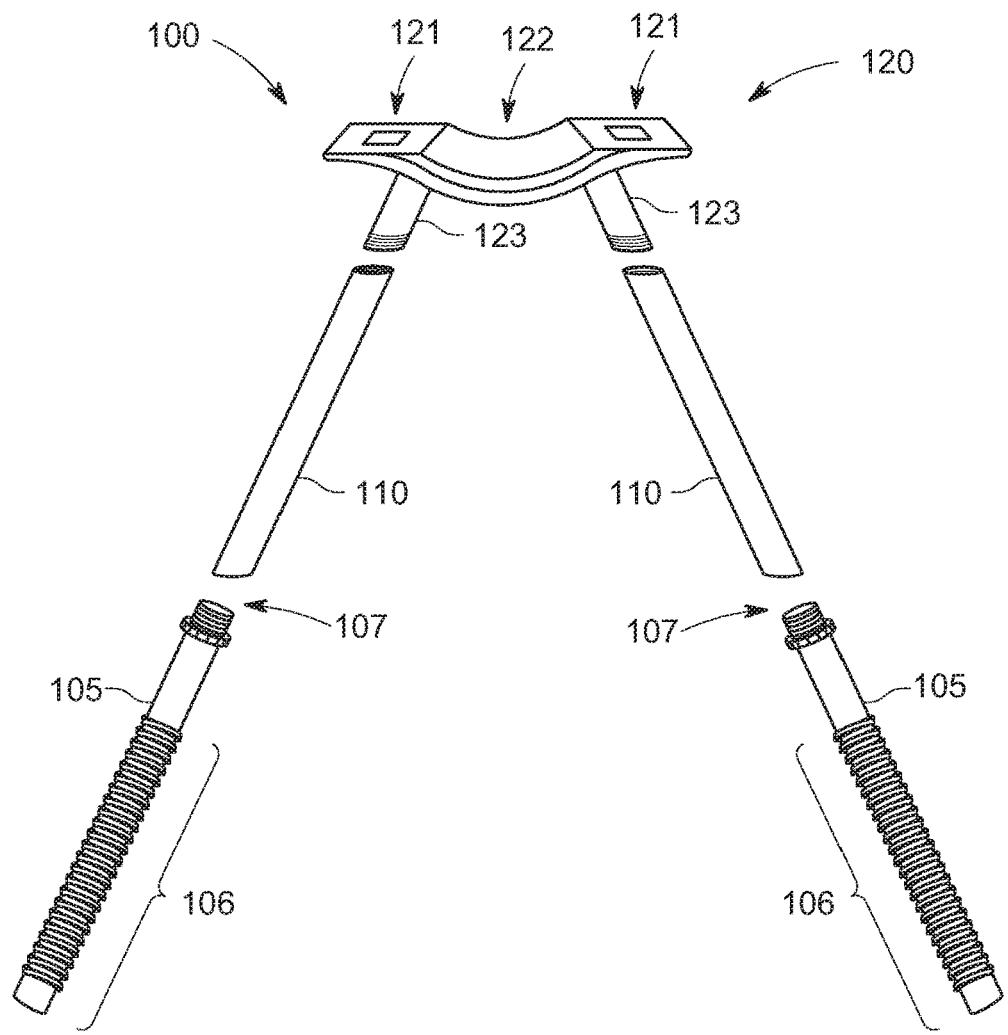
FIG. 1A is an exploded view of a foundation system installed with equipment according to various embodiments of the invention.

Turning now to the drawing figures, where like numerals are used to refer to like structures, FIG. 1A is an exploded view of a multi-piece truss foundation according to various embodiments of the invention. As discussed in the background above, truss foundation 100 is meant to replace conventional H-piles as a foundation to support single-axis solar trackers and other structures. The system includes a pair of truss legs, each composed of a screw anchor 105 joined to an upper leg 110. Screw anchors 105 are elongated hollow members with an external thread form 106 beginning at the below-ground end and a driving coupler 107 at the above-ground terminal end. In various embodiments, driving coupler 107 is selectively coupled to the chuck of a rotary driver to enable anchor 105 to be driven into supporting ground. Driving coupler 107 also provides a mechanism for joining upper legs 110 to their respective screw anchors. As shown, the portion of driving coupler 107 that extends upward is received into the open end of one of the upper legs. Similarly, coupling portions 123 projecting below TRUSS CAP or adapter 120 are received into the opposing end of each upper leg 110 to complete the A-frame-shaped truss structure. In various embodiments, a crimping device is used to secure the overlap connections between adapter 120 and upper legs 110 and between upper legs 110 and their respective screw anchors 105. It should be appreciated, however, that other methods of joining these structures may also be used, including set screws, bolts, threads or other suitable methods.

Figure 1B:
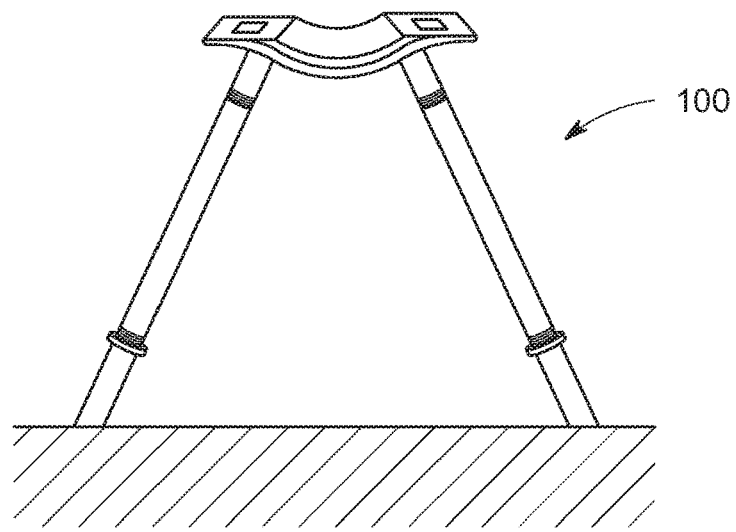
FIG. 1B is a front view of the foundation system shown in FIG. 1A after assembly.

FIG. 1B shows a completed truss foundation 100 of FIG. 1A. Upper legs 110 have been sleeved over driving couplers 107 as well as over connecting portions 123 of adapter or truss cap 120 and the overlapping areas crimped. When installing a foundation for a single-axis tracker, dozens of such foundations 100 are installed along an intended North-South oriented tracker row with the truss legs straddling the row. In various embodiments, recessed portion 122 will be elevated directly above the North-South line of the row. This portion 122 may act as a rest for the torque tube while bearings and drive motors are attached to their respective foundations. A single row may span more than 300 feet and include more than a dozen such foundations as well as one or more tracker motor foundations.

FIGS. 1A and B show but one type of foundation that may be installed with the various machines shown and discussed in the context of this disclosure. It should be appreciated that foundation components driven with the various machines disclosed herein may take on other forms as well. As used herein, the term "screw anchor" is used generally to refer to a foundation component that is rotated into the ground with a combination of torque and downforce, with or without the assistance of a tool, drill or other assisting mechanism through its open center.

The remaining figures show various different screw anchor driving machines as well as flow charts of related methods of operating such machines to effect a screw anchor driving operation according to various embodiments of the invention. Starting with FIGS. 2A and B, these figures are front and side views respectively of screw anchor driving machine 200 for installing a pair of adjacent screw anchors according to various exemplary embodiments of the invention. In order to form a truss foundation, the truss legs must be oriented at angles relative to one another rather than driven plumb. To that end, various embodiments of the invention provide a machine adapted to drive two adjacent screw anchors at the same time or in overlapping time at angles relative to one another. As discussed above in the context of FIGS. 1A and B, in various embodiments, each adjacent leg will consist of a two or more sections—a threaded or partially threaded screw anchor driven until only a portion remains above ground, and an upper leg coupled to the screw anchor. The focus of this disclosure is limited to machines and methods for installing screw anchors of each adjacent foundation pair. The anchors shown herein are exemplary only and should not be construed as limiting on the various embodiments of the invention.

Exemplary machine 200 is a tracked vehicle powered by a gasoline or diesel engine similar to various other tracked vehicles known in the art including general-purpose equipment such as backhoes and excavators, as well as purpose-built pile driving rigs, drill-rigs and the like. Such vehicles are typically made for off-road use only and therefore are geared for power rather than speed, and ride on metal or rubberized tracks such as tracks 212. Tracks provide greater traction and much larger contact surfaces with the supporting ground relative to tires. Chassis 214 rides on tracks 212 and supports main body 216. Main body 216 includes the motor, a controllable connection to an accessory mast, and a set of physical controls as well as one or more electronic control interfaces such as to a separate remote control. In FIG. 2B, hydraulic control interface is shown. In various embodiments, this may enable an operator to walk beside the machine while staying out of the way of the moving tracks. In other embodiments, the machine may include a touch screen or other tactile human interface instead of or in addition to the hydraulic control interface and may operate in partial or fully autonomous mode. For example, though not shown, the machine may include a GPS-based positioning system that drives the machine to the appropriate location.

In various embodiments, main body 216 is operable to rotate about chassis 214 while the chassis remains stationary to work 360-degrees around the machine without moving it. In exemplary machine 200, at least one hydraulic accessory movement assembly 218 includes at least one hydraulic articulating arm 218A that enables machine 200 to pitch accessory mast 220 forward and backward. Assembly 218 may also include a second lifting and telescoping arm 218B that enables the machine to move the accessory mast 220 vertically (in Z) and horizontally (in X). Though not shown, assembly 218 may also include a trunnion subassembly that allows machine 200 to adjust accessory mast 220 in yaw with respect to the machine.

Machine 200 and hydraulic accessory movement assembly 218 provide motive power and movement respectively to driving components located on accessory mast 220. As shown, mast 220 includes parallel frame members 221 that serve as a scaffold to support the driving assemblies 230A/B and driving arms 231A/B. Frame members 221 may also enable entire accessory attachment 220 to be disconnected from machine 220, if necessary, such as for repair, servicing, replacement, and/or for transport. This type of modular configuration is often used with general purpose equipment such as excavators, tractors and backhoes so that they can receive attachments to perform specific tasks.

Driving assemblies 230A/B are attached to frame members 221 via mounting plate 225 and are configured in an upside-down V shape separated by an adjustable angle via rotating plates 233A/B. In various embodiments, plate 225 may be moved up and down along frame members 221 to set an initial driving height of the mast. In various embodiments, plate 225 may be adjusted vertically until common hinge point 228 is aligned with the intended work point height of the truss, that is the height above ground of the intersection of imaginary straight lines through the center of each leg. In various embodiments, in order to drive a pair of screw anchors to achieve a consistent work point height, accessory mast 220 is leveled or adjusted to an orientation normal to the intended position of the torque tube, and is also adjusted in pitch, roll and yaw with respect to the machine, if necessary to be properly aligned along the intended North-South row of the tracker with other foundations in the same row. Then, driving arms 231A/B are rotated to their respective driving angles and assemblies 230A/B are lowered along arms 231A/B until they reach the ground. In this example, after the anchors are loaded, each mandrel 243A/B will extend out of the open end, lower end of its corresponding anchor by a few inches. In various embodiments, mandrels 243A/B and anchors 105 will maintain this spatial relationship during driving to allow the mandrel tip to function like a screw tip and/or a drill helping to keep the anchor on-axis, increasing soil pressure around the thread form, and even drilling through rocks and cementitious soils, if necessary. In various embodiments, the tip of each mandrel 243A/B may be removable, even after a screw anchor is attached, to allow different tips to be used for different soil conditions, and/or to allow the tip to be replaced or serviced.

Figure 2A:
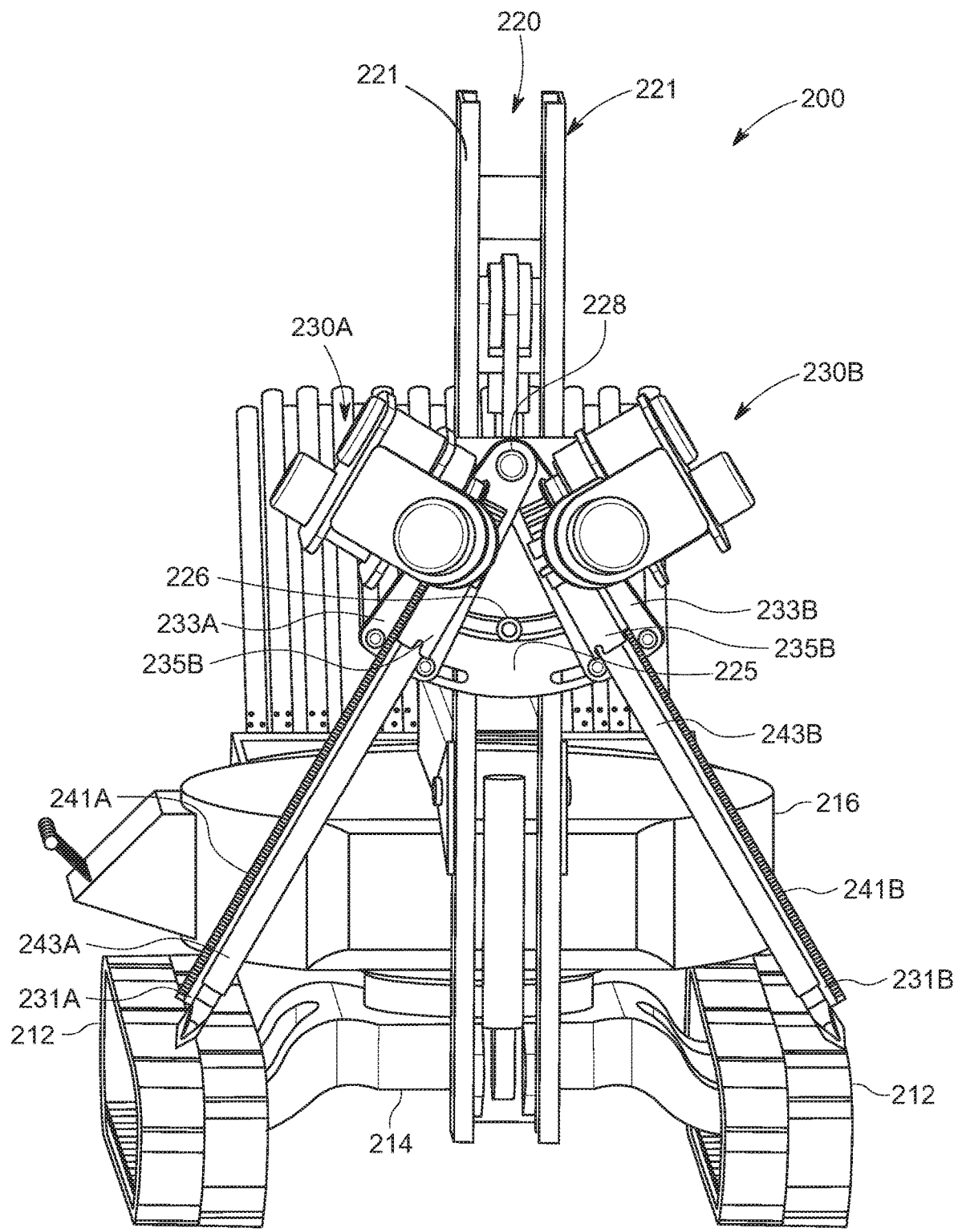
FIG. 2A is a front view of a machine for driving a pair of screw anchors at substantially the same time according to various embodiments of the invention.
Figure 2B:
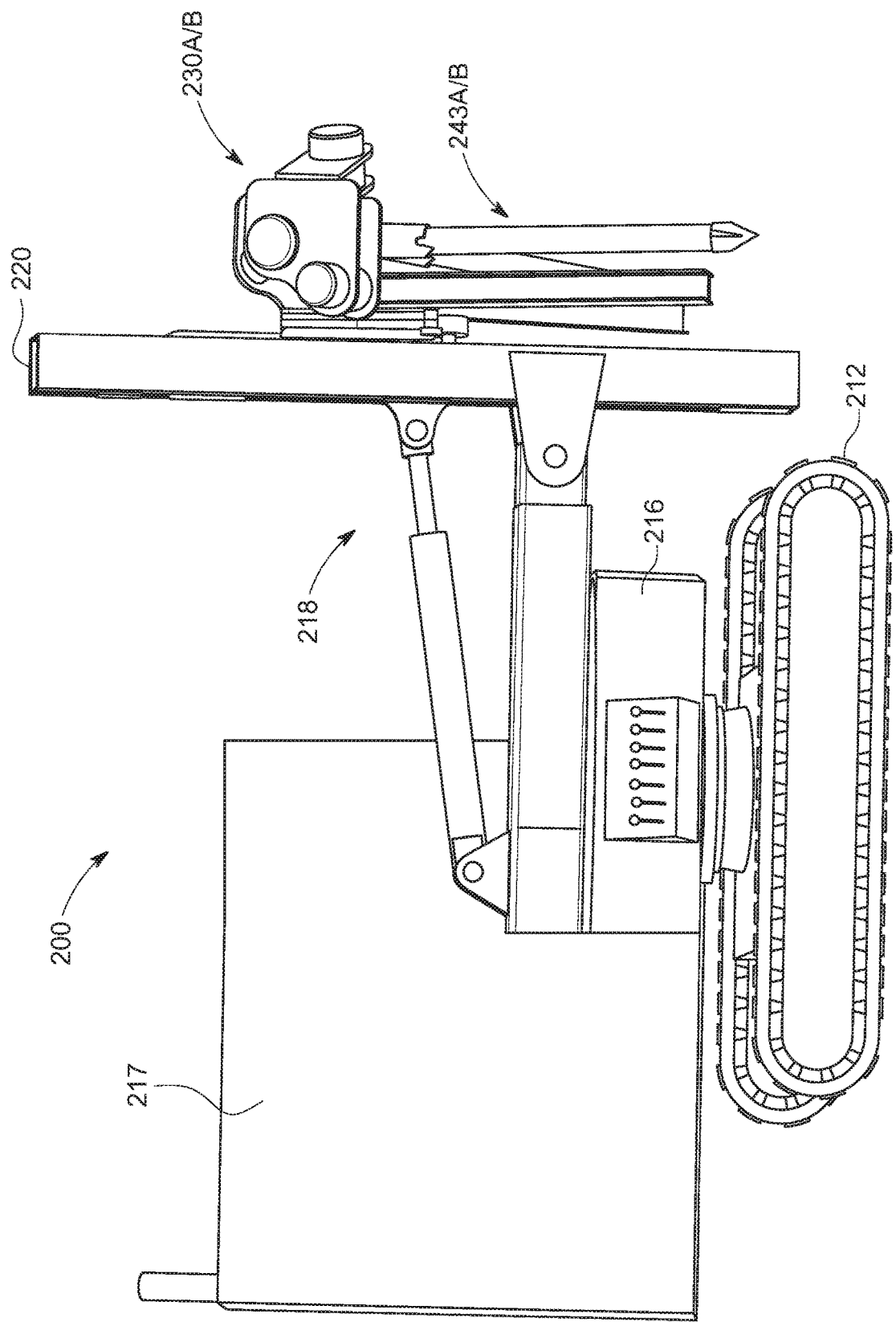
FIG. 2B is a side view of the machine of FIG. 2A.

It should be appreciated that FIG. 2A could depict either a front or rear view of the machine depending on where accessory attachment 220 is positioned with respect to the machine's orientation. Frame members 221 shown here are joined together with orthogonal members to make a ladder-like frame member. In some embodiments, frame 221 may be fixed and only moved by the actuating hydraulic accessory movement assembly 218 connecting attachment 220 to the machine. In other embodiments, part or all of frame members 221 may move independent of assembly 218, such as, for example, sliding up or down vertically and/or sliding left or right (in the Y-direction), or even rotating about the one or more articulating arms (in roll) to compensate for uneven ground under the machine.

As shown in the figures, frame members 221 support a pair of independent driving assemblies 230A and 230B via mounting plate 225. As discussed above, both assemblies 230A/B may travel together up and down frame members 221 to orient them to the correct work point height. In various embodiments, they may also move independent of one another along their respective driving arms 231 to enable a pair of screw anchors to be driven into the ground at angles to each other and at independent rates of feed and speed.

Figure 2C:
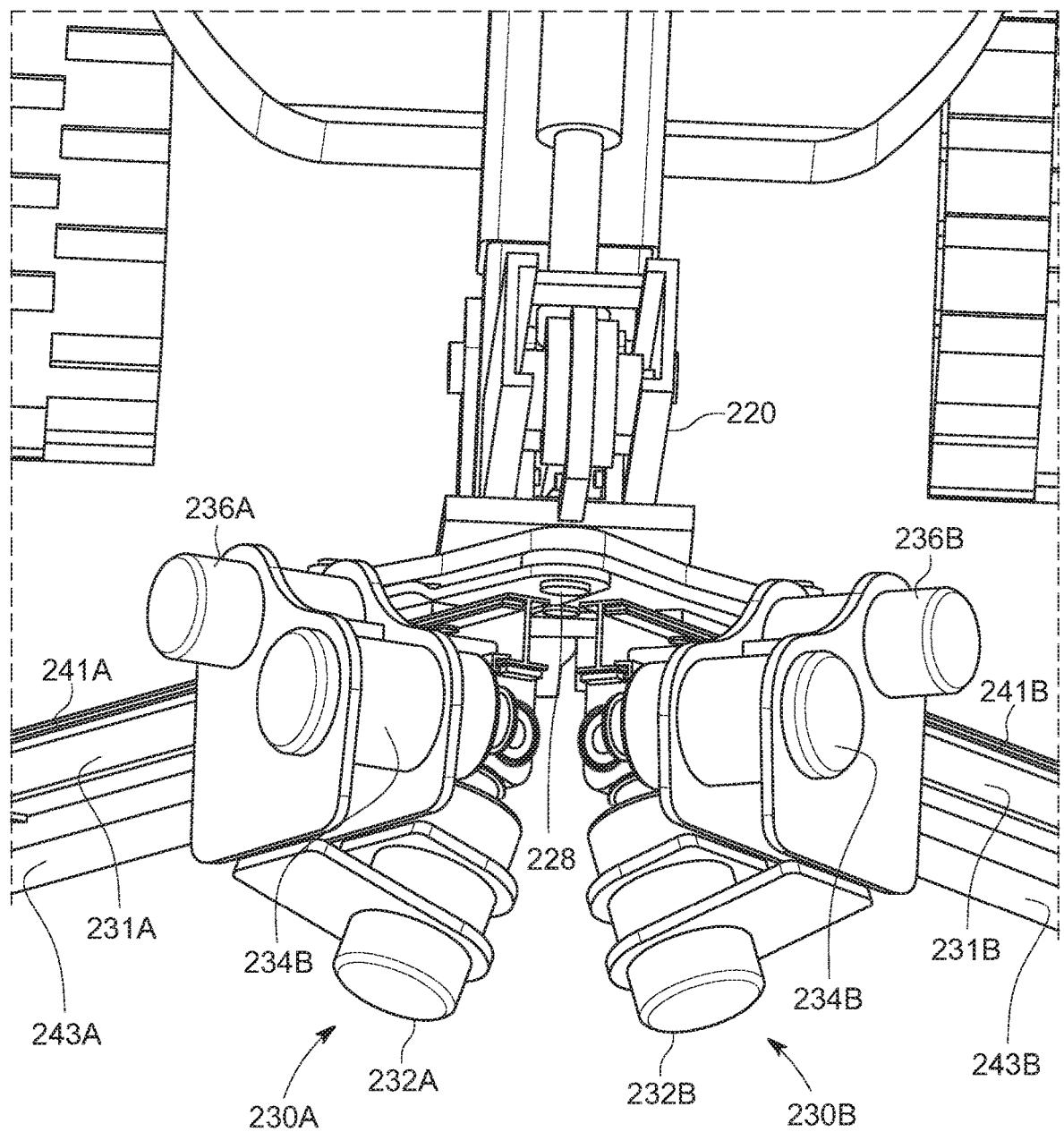
FIG. 2C is a top view of a portion of the machine of FIGS. 2A and 2B.

FIG. 2C is a close-up showing details of the components of drive assemblies 230A/B. As drawn, assembly 230B is essentially the same as assembly 230A, however, in various embodiments they do not need to be exactly the same. In the example of the figures, rotational adjustment of each assembly 230A/B in-plane is about common hinge point 228. In various embodiments, each assembly 230A/B may swing through a range of angles about common hinge point 228. Common hinge point 228 may unite each assembly 230A/B onto shared mounting plate 225, with hinge brackets 233A/B to enable them to rotate with respect to frame members 221. In some embodiments, common mounting plate may be fixed to the frame so that it does not move independent of the frame, however, in other embodiments, it may move in-plane, up and down frame members 221. In such embodiments, hinge brackets 233A/B swing through respective arcs corresponding to a range of possible driving angles. As shown, pins on the back side of each hinge bracket 233A/B engage respective channels formed in shared mounting plate 225. In other embodiments, plate 225 may also move about hinge pin 226 via its own channel and a boss pin connected to the frame. This may be particularly useful when driving on sloped ground to recalibrate frame members 221 to a vertical orientation before moving hinge brackets 233A/B to the desired driving angle(s).

In various embodiments, the angle between the driving axes defined by the two hinge brackets may vary in a range from as little as 35-degrees to as much as 70-degrees, corresponding to anchors driven in the ground at angles in a range of ±55 degrees to ±72.5 degrees. In other embodiments, the angle between the two hinge brackets may be limited to a range of 40 degrees to 60 degrees, corresponding to anchors driven in the ground at angles in a range of ±60 degrees to ±70 degrees.

Continuing with FIG. 2C, in this example, each driving assembly 230A/B consists of three independent motors 232A/B, 234A/B and 236A/B. It should be appreciated that although three motors are shown, in various embodiments fewer or more motors may be used. Also, one or more of the motors may be positioned elsewhere, such as at the base of each driving arm 231A/B. For example, the motors used to move respective assemblies 230A/B may be fixed at or near the distal end of each arm 231A/B and used chain to move assemblies 230A/B along their respective arms.

As shown, motors 232A/B, 234A/B and 236A/B are oriented to extend away from the driving axes to prevent mechanical interference between the two assemblies near common hinge point 228 while driving. After driving begins, the motors of each assembly 230A/B will move away from each other as they travel down their respective drive arms 231A/B. For a given driving angle, the maximum screw anchor length will in part be dictated by the intended work point of the truss foundation. When the truss is complete, the work point will be the apex of the triangle created by the legs of the A-frame. On the machine, the work point may will coincide with common hinge point 228 since each driving arm 231A/B will always point at it. When simultaneously driving adjacent screw anchors with the machine of FIGS. 2A-C, neither assembly may pass through hinge point 228 but both should start as close to it as possible to maximize the length of anchor that can be used for a given work point height.

The first motor of each assembly 230A/B is rotary drive motor 232A/B. In various embodiments, rotary driver motors 232A/B impart torque to the head of each screw anchor. As shown, the output of each rotary drive motor 232A/B engages a gear that in turn causes rotary drivers 235A/B to impart torque to attached screw anchors. Motors 232A/B may be powered by a hydraulic fluid, as is known in the art, or alternatively, by electric current, coming from machine 200. As seen in 2C, the top of each screw anchor is received within the driving collars 235A/B of rotary drivers 232A/B. One or more recesses formed in collars 235A/B may engage protruding features in the screw anchor heads to enable them to be driven in either direction (e.g., clockwise or counter clockwise). Alternatively, pins, bolts or other fasteners may be used to temporarily couple each screw anchor to its respective collars 235A/B. The specific method of engagement with the upper end of each screw anchor is not critical to the various embodiments of the invention.

In various embodiments, screw anchors are loaded onto the respective assemblies 230A/B by sleeving the upper end of each anchor over the tip of mandrels 243A/B and sliding them up the respective shafts until they reach rotary drivers 235A/B. The tip of each mandrel 243A/B may protrude slightly out of the bottom end of each anchor once the anchor is loaded. In various embodiments, a second drive motor 234A/B on each assembly 230A/B is used to drive mandrels 243A/B or other tools. As shown, the output shaft of these second motors 234A/B engages the upper or top gear assembly which in turn rotates a fitting that rotates and/or moves mandrels 243A/B. In various embodiments, this fitting passes through the center of rotary drivers 235A/B so that mandrels 243A/B extend along the same axis as screw anchors 105 but can move independent of them through their respective centers. It should be appreciated that in other embodiments, instead of using a gear assembly to rotate the mandrel, compressed air or hydraulics may be used to reciprocate the mandrel within the shaft of the screw anchor in addition to rotation to clear a path ahead of it and even to break up small rocks or other impediments encountered while driving. For example, a drill bit may be located at the tip of each mandrel 243A/B. Having separate motors 234A/B to the mandrels allows them to be actuated at different rotational speeds than screw anchors.

The third pair of motors shown in assemblies 230A/B are axial drive motors 236A/B. In various embodiments, these motors control movement of assemblies 230A/B in the axial direction, that is up and down drive arms 231A/B. In various embodiments, the rate of travel provided by these motors will be synchronized to the effective rate of travel of rotary driver motors 232A/B so that screw anchors are pushed into the ground at the same rate that their thread pitch and rotational speed will allow them to travel to prevent augering of the bore hole. As shown, these motors 236A/B have a geared output shaft that communicates with respective rack gears 241A/B extending along each arm 231A/B. As discussed above, in alternative embodiments, axial drive motors 236A/B may be fixed at the lower end of each arm 231A/B. In such embodiments, a driven chain may be connected to an output gear of each drive motor 236A/B to pull assemblies 230A/B up or down respective drive arms 231A/B. When screw anchors are driven to their target depth, drive motors 236A/B enable assemblies 230A/B to be retracted up and away from the driven anchors so that another pair of anchors may be loaded.

Figure 3A:
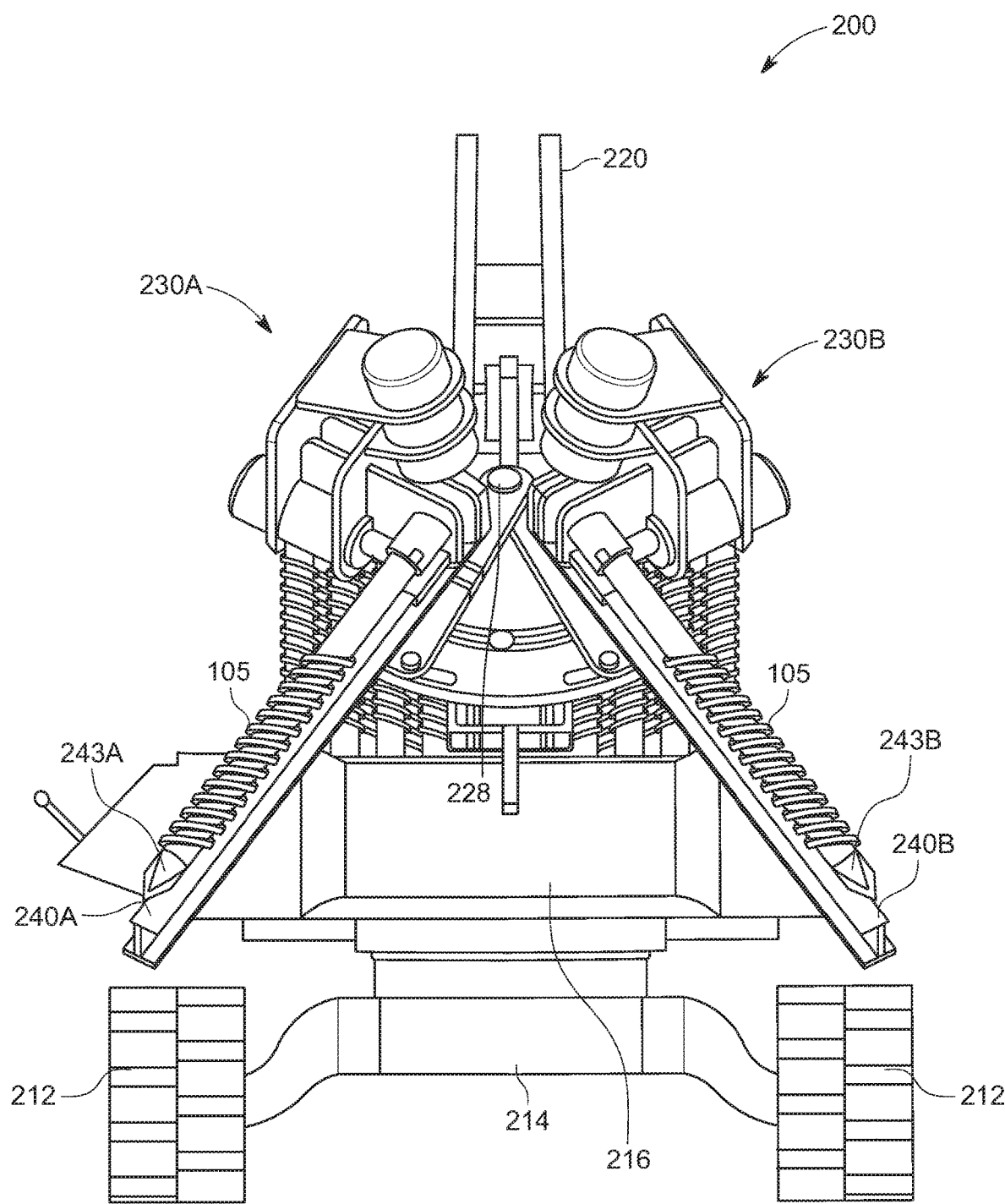
FIG. 3A is a front view of the machine of FIG. 2A after a pair of screw anchors have been loaded onto the respective drivers.
Figure 3B:
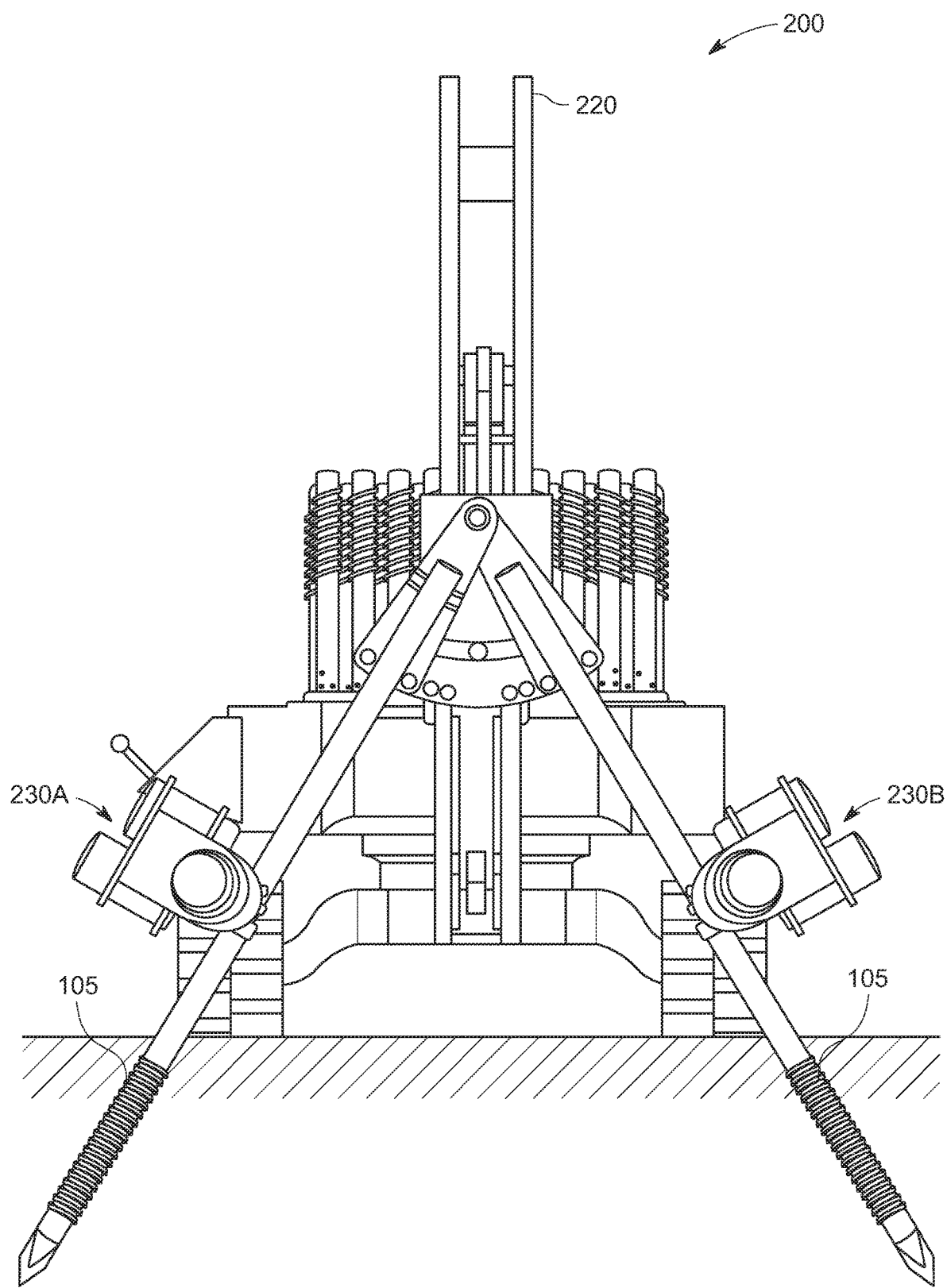
FIG. 3B is a front view of the machine of FIG. 3A at an intermediate driving stage.
Figure 3C:
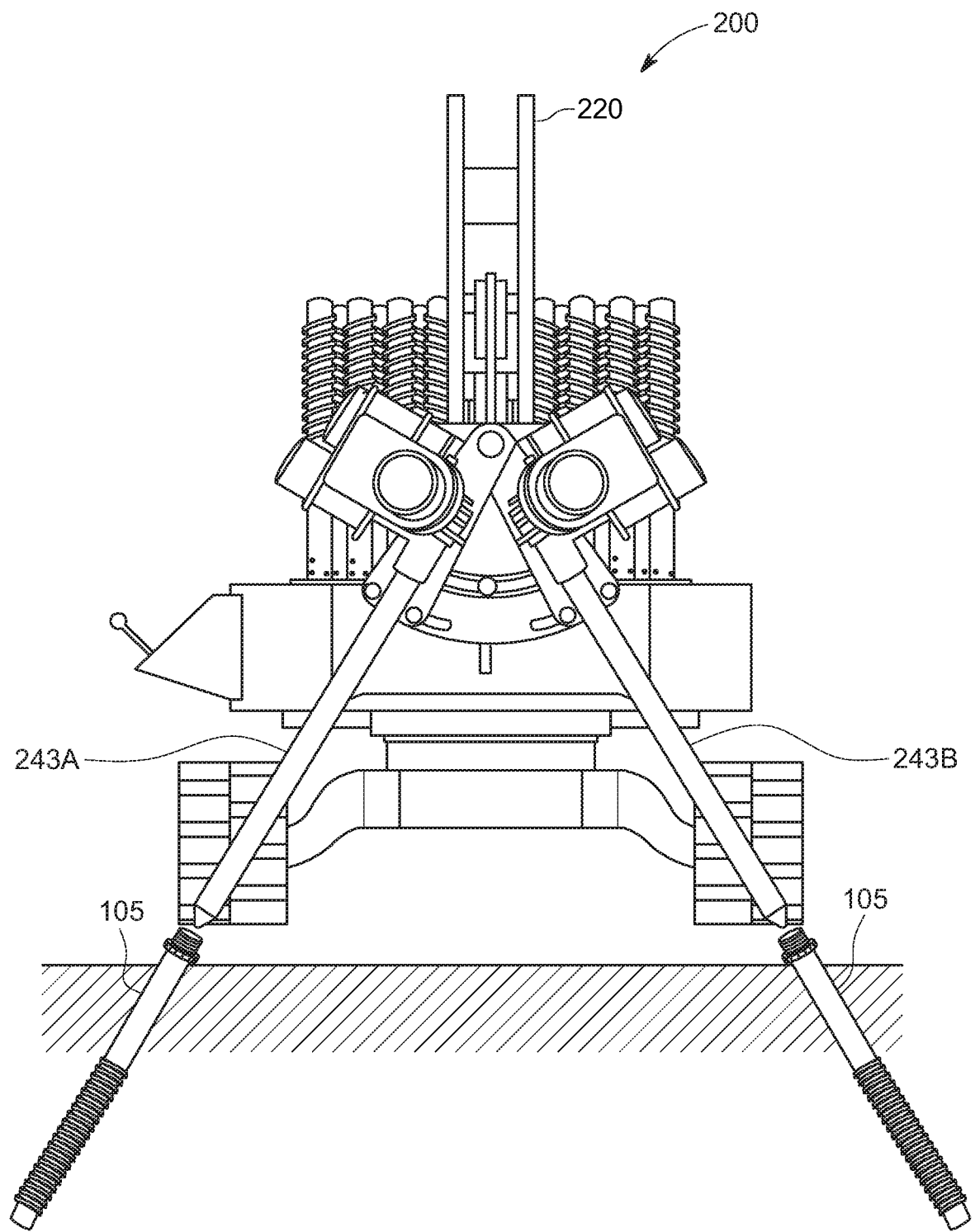
FIG. 3C is a front view of the machine of FIG. 3A after a pair of adjacent screw anchors have been driven and the drive assemblies have been withdrawn.

FIGS. 3A-C show front views of exemplary screw anchor driving machine 200 of FIGS. 2A-C engaged in different stages of a screw anchor driving process according to various embodiments of the invention. Starting with 3A, in this figure, machine 200 has been loaded with a pair of screw anchors 105. In various embodiments, the diameter of mandrels 243A/B is small enough to enable them to fit inside rotary drivers 235A/B while leaving sufficient clearance for hollow screw anchors to fit in the space between the outside diameter of the mandrel and the inside diameter of the rotary driver.

FIG. 3B shows exemplary machine 200 of 3A, after a simultaneous screw anchor driving operation has begun. Motors 232A/B are actuated to move assemblies 230A/B down their respective arms to put down force on the head of the screw anchors and mandrel while motors 234A/B impart torque to the head of each anchor. The combined rotation of the rotary driver, sympathetic action of the mandrel driver, and downward force of the axial driver on the entire assembly cause the screw anchors to steadily penetrate into the ground. In various embodiments, the force of these three components is maintained until each anchor reaches its target depth.

FIG. 3C shows machine 200 after each anchor has been driven and drive assemblies 230A/B are retracted along their respective drive arms 231A/B. In various embodiments, assemblies 230A/B are retracted up their respective arms 231A/B until mandrels have emerged from the open, above-ground end of each driven screw anchor 105. Once the end of each mandrel 243A/B clears its screw anchor, attachment 220 may be elevated to up and away so that the machine 200 can be moved to the next foundation location. As shown in this example, a portion of each screw remains above ground after driving. In various embodiments, the screw anchors are long enough to achieve the desired embedment depth as well as to provide several additional inches of above-ground length to facilitate attachment to above-ground truss components. In various embodiments, retraction of the driving assemblies occurs by engaging the drive motors to move each assembly along its drive axis in the opposite direction from driving. In other embodiments, this may also be accomplished in part by telescoping a portion of each mandrel into itself to provide clearance.

Figure 4:
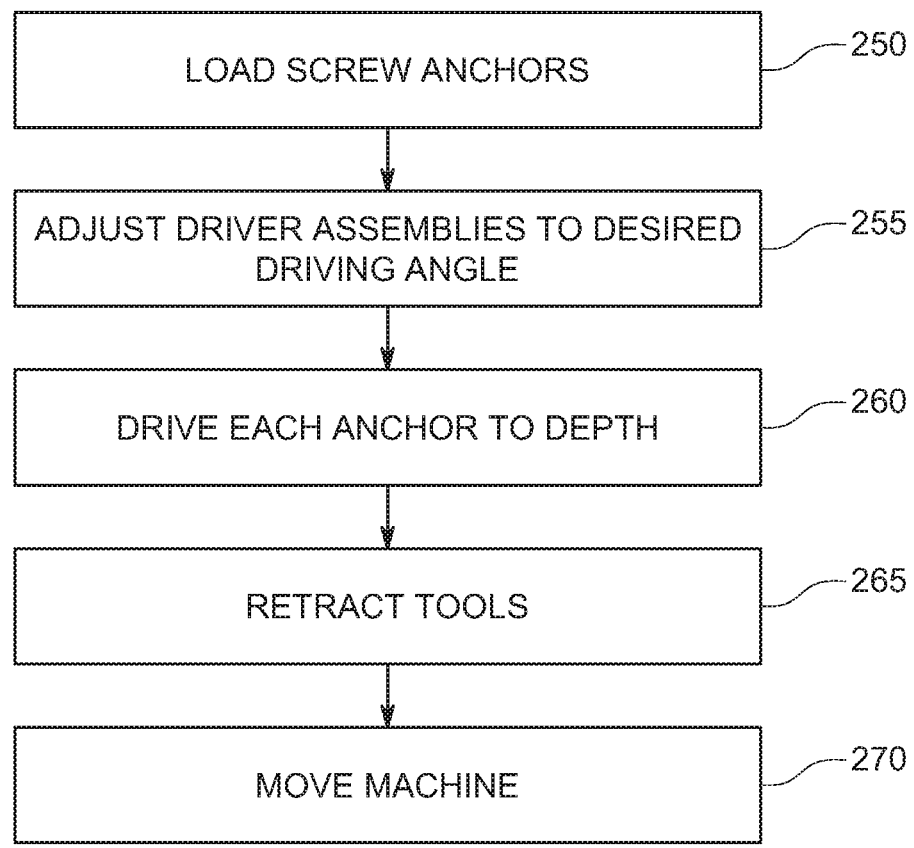
FIG. 4 is a flow chart detailing the steps of a method for driving a pair of adjacent screw anchors with the machine shown in FIGS. 2A-C and 3A-C according to various embodiments of the invention.

Turning now to FIG. 4, this figure is a flow chart detailing the steps of an exemplary method for simultaneously driving screw anchors with a machine according to the various embodiments of the invention. The method begins in step 250 with loading the machine with a pair of screw anchors. In various embodiments and as discussed and shown herein, this may consist of loading a pair of elongated, open-ended screw anchors onto respective mandrels of a dual screw anchor driving machine or attachment. The attachment or mast of the machine may be oriented to a loading geometry to provide easy access to the mandrels. In various embodiments, this may be done by a human operator or, alternatively, by a semi or fully autonomous loader. Once the screw anchors are sleeved over their respective mandrels, they are coupled to their respective rotary drivers. This may be done with one or more pins or features that allow the anchors to be rotated into a locked position with the rotary driver and to be unlocked by reversing the driver. As discussed herein, in various embodiments, when the anchors are loaded, the mandrel tip may protrude some distance out of the open, threaded end of each anchor.

Next, in step 255, the individual assemblies are adjusted to their respective desired driving angles. In various embodiments, this is accomplished by rotating a hinge bracket about a fixed rotation point as shown and discussed above. If the machine is on relatively flat ground, each assembly may be oriented to a reciprocal angle (e.g., ±70 degrees with respect to grade). Otherwise, if the ground slopes in the East-West direction, the degree of slope may be added or subtracted from the driving angle to achieve alignment with other anchors in the current row. Alternatively, the shared hinge or mounting plate may first be rotated to provide a plumb reference for the individual assemblies before the individual assemblies are rotated to their respective driving angles. In various embodiments, the driving assemblies are oriented with respect to each other in a common plane so that an imaginary line extending along each driving axis will intersect in free space. Co-planarity may be important to ensure that loading forces applied to the A-frame are non-bending (i.e., tensile and compressive only). In various embodiments, the point of intersection coincides with the hinge point rotationally interconnecting the hinge plate and hinge brackets.

After the driving assemblies have been oriented to the desired driving angle, in step 260, each anchor is driven to depth. As discussed herein, driving an anchor to depth may consist of several simultaneous actions. In some embodiments, this may occur at the same time. In other embodiments, the first assembly may drive until sufficient clearance is achieved and the second assembly may then begin driving. In various embodiments, each rotary driver may be actuated to begin rotating the screw anchors in the driving direction (e.g., clockwise or counter clockwise) dictated by the orientation of the threads or partial thread form. In various embodiments, at substantially the same time, the mandrel drivers are actuated to begin rotating the mandrels or in some cases hammering or vibrating them within the shaft of and ahead of each anchor. In addition, the axial drive motors will be actuated to apply downward pressure to the rotary driver and mandrel driver assemblies to motivate the anchors and mandrels into the ground in straight lines and along the driving axes dictated by the orientation of the drive arms. In various embodiments the action of all three will be synchronized in real-time to achieve the desired feed and speed for the current anchors. In various embodiments, this simultaneous action will continue until each anchor reaches the target depth. Because they are being driven independently, one may reach its target depth before the other. In some embodiments, the mandrel may pause operation or retract along its axis while the rotary driver continues to drive the anchor through any void created by the mandrel tip.

Once the target depth is reached, the process of withdrawal begins in step 265. In various embodiments, this may consist of a combination of reversing the axial drive motor to move each assembly along its drive arm away from the driven anchors combined with counter rotation of the rotary drivers to decouple them from the driving collars. It may also be necessary to remove any pins used to couple each anchor to its rotary driver before actuating the drive motor to move the assembly away from the anchor. Once the driving assembly, including the mandrels have cleared the above-ground ends of each anchor, the machine may be moved along the North-South installation line of the tracker assembly to the next driving location in step 270. In various embodiments, one or more known GPS-based systems may be used to move the machine to a precise location along the North-South line so that the next pair of anchors can be installed at the location specified in the site plan.

Depending on the desired work point height for the truss foundation, it may not be possible to drive two screw anchors at the same time with the machine shown in FIGS. 2A-B. In particular, lower work point heights will make clearance between the driving assemblies more difficult. Soil properties may also make simultaneous driving difficult because unstructured soils may require longer screw anchors and correspondingly deeper driving depths to achieve the required resistance to forces of tension and compression without raising the work point height. In response to this problem, various embodiments of the invention provide a machine that can simultaneously drive two standard length anchors, or alternatively, a single extended length anchor at a first angle, and then a second adjacent extended length anchor at a second angle. Such a machine is shown, for example, in FIGS. 5A and B.

Figure 5A:
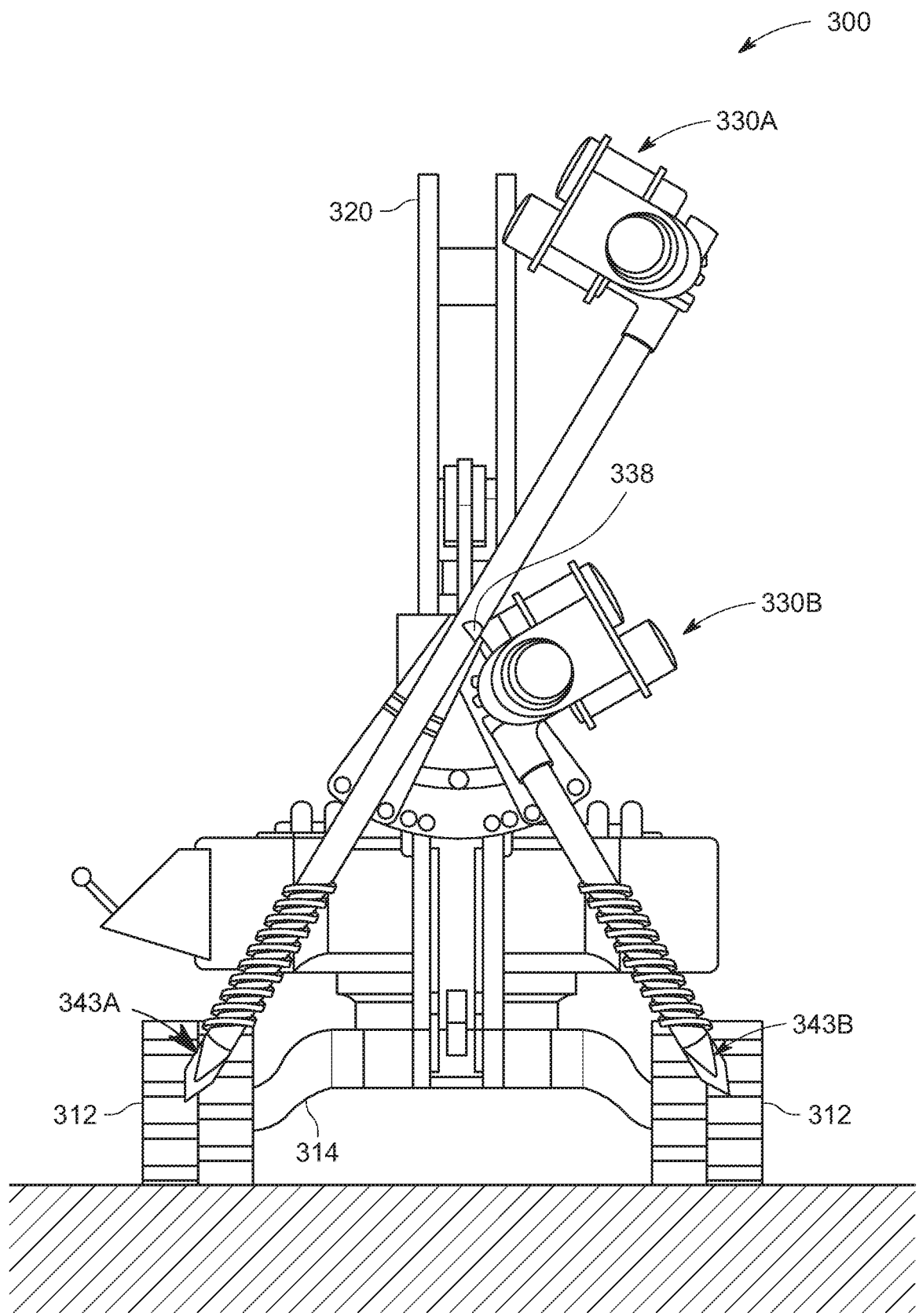
FIG. 5A is a front view of another screw anchor driving machine according to various other embodiments of the invention.

Machine 300 of FIGS. 5A and B is similar to machine 200 of the previous figures but instead of having two symmetric driving arms, one of the arms 331A is extended in length. This allows machine 300 to be used in a simultaneous driving mode where two standard length screw anchors are driven at substantially the same time, or alternatively, in a serial mode where a first extend length anchor is driven and then the extend driving arm is rotated to a second angle so that a second extend length anchor may be driven. In exemplary machine 300, extended length drive arm 331A passes through common hinge point 338. This asymmetric configuration allows extended length anchors to be loaded and driven in a serial driving mode. When driving serially, the extended length anchor is loaded onto extended mandrel 343A of extended driving 331A assembly and the assembly is rotated about hinge point 338 to the desired angle (e.g., 70-degrees with respect to horizontal). Screw anchors driven to depth in the same manner, (i.e., by a combination of the action rotary driver, the mandrel and the axial drive motor) until the target depth is reached. The rotary driver is then decoupled from the anchor and the driver and mandrel are backed away in the axial direction along arm 331A until the tip of extended mandrel 343A clears the driven anchor. A second anchor must be loaded onto the mandrel while machine 300 remains at the same location. This may be done before rotating the extended driving assembly 330A to the desired angle for the second anchor or after. In either case, once the extended assembly 330A is oriented at the desired angle, the extended driving assembly once again travels along extended drive arm 331A while driving the extended length anchor to target depth. If the additional length provided by the extended driving assembly is not needed, simultaneous driving may be performed by both assemblies 330A/330B in a manner consistent with that discussed in the context of the previous figures. Both drive assemblies are supported by mast 320.

Figure 6:
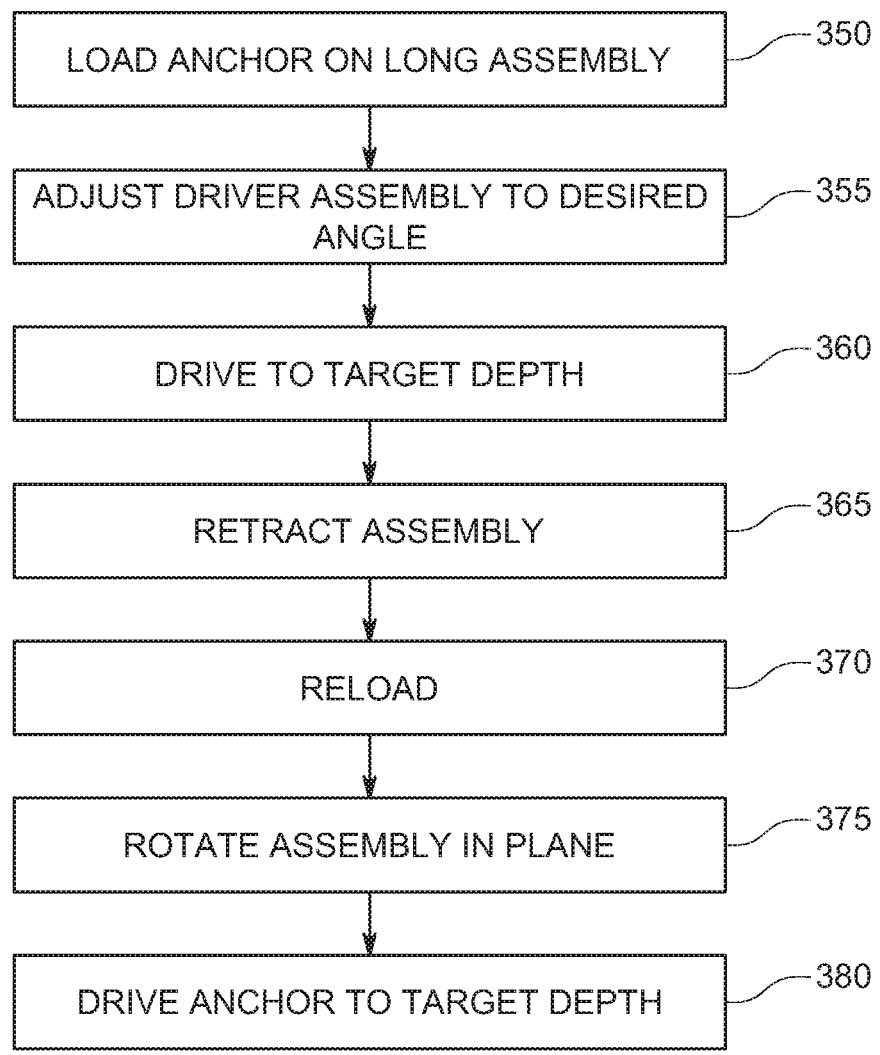
FIG. 6 is a flow chart detailing the steps of a method for driving a pair of adjacent screw anchors with the machine shown in FIGS. 5A-B according to various embodiments of the invention.

FIG. 6 is a flow chart detailing the steps of a method for driving single, extended-length screw anchors with the extended anchor driving assembly of FIGS. 5A and B. The method begins in step 350 by loading a screw anchor onto the extending assembly. In various embodiments, this may consist of moving the drive assembly up the rail until sufficient clearance is achieved. The anchor may then be manually sleeved over the mandrel until the top of it engages the rotary driver. In other embodiments, this may consist of placing the anchor into a holder attached to the extended driving assembly arm so that as the moving assembly slides down the rail, the mandrel enters the top, open end of the anchor and travels through the shaft until the top of the anchor engages the rotary driver. In other embodiments, an automated or robotic loader could pick and place anchors from a supply and load them onto the rail. After the anchor is loaded, in step 355 the machine may rotate the driving assemblies about the hinge point until the extended driving assembly's drive axis is oriented at the desired drive angle for the first screw anchor. Then, in step 360, the first screw anchor is driven to the target depth. As discussed herein, in various embodiments, this is accomplished by engaging an axial drive motor to move the driving assembly down the mast, a rotary driver to impart torque to the head of the anchor and a tool driver to actuate a mandrel or drill through screw anchor. Once the first screw anchor has been driven to target depth is reached, in step 365 the mandrel and driving assembly automatically retract by traveling back up the driving arm until the top of the driven anchor is cleared. In step 370, an operator or automated loading mechanism must load the assembly with a second anchor. Once loaded, in step 375 the driving assemblies rotate within the same plane until the extended assembly is oriented at the second driving angle. Because the extended assembly passes through the work point, it can drive anchors in either direction (East or West). In step 380 the extended driving assembly is actuated again to drive the second anchor of the pair at the second angle until it reaches the target depth. The machine is then moved along the North-South line of the tracker row or onto the next row where the process of driving the anchor pair starts again.

Figure 5B:
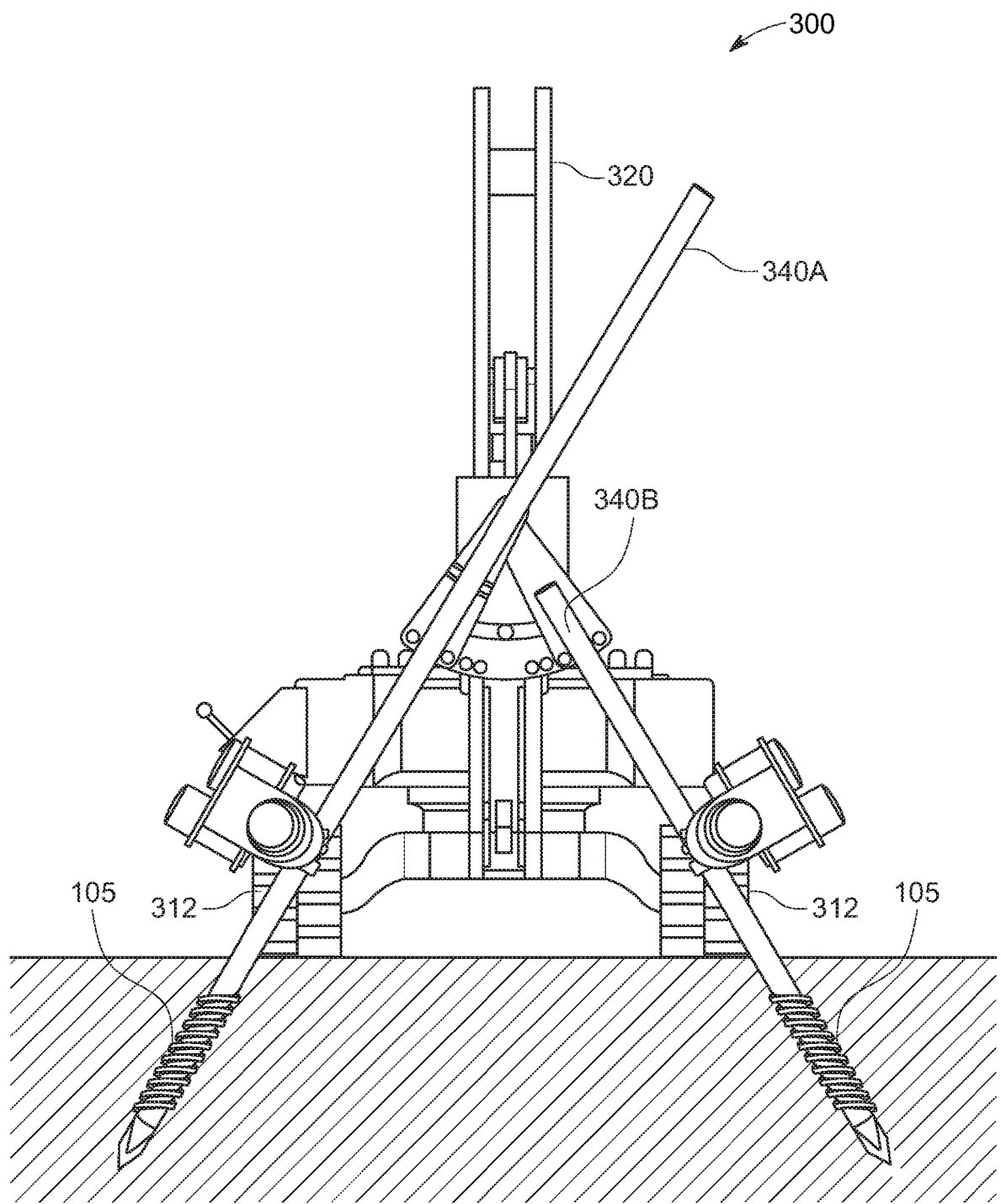
FIG. 5B is a front view of the machine of FIG. 5A while driving a pair of adjacent screw anchors into the ground.
Figure 7A:
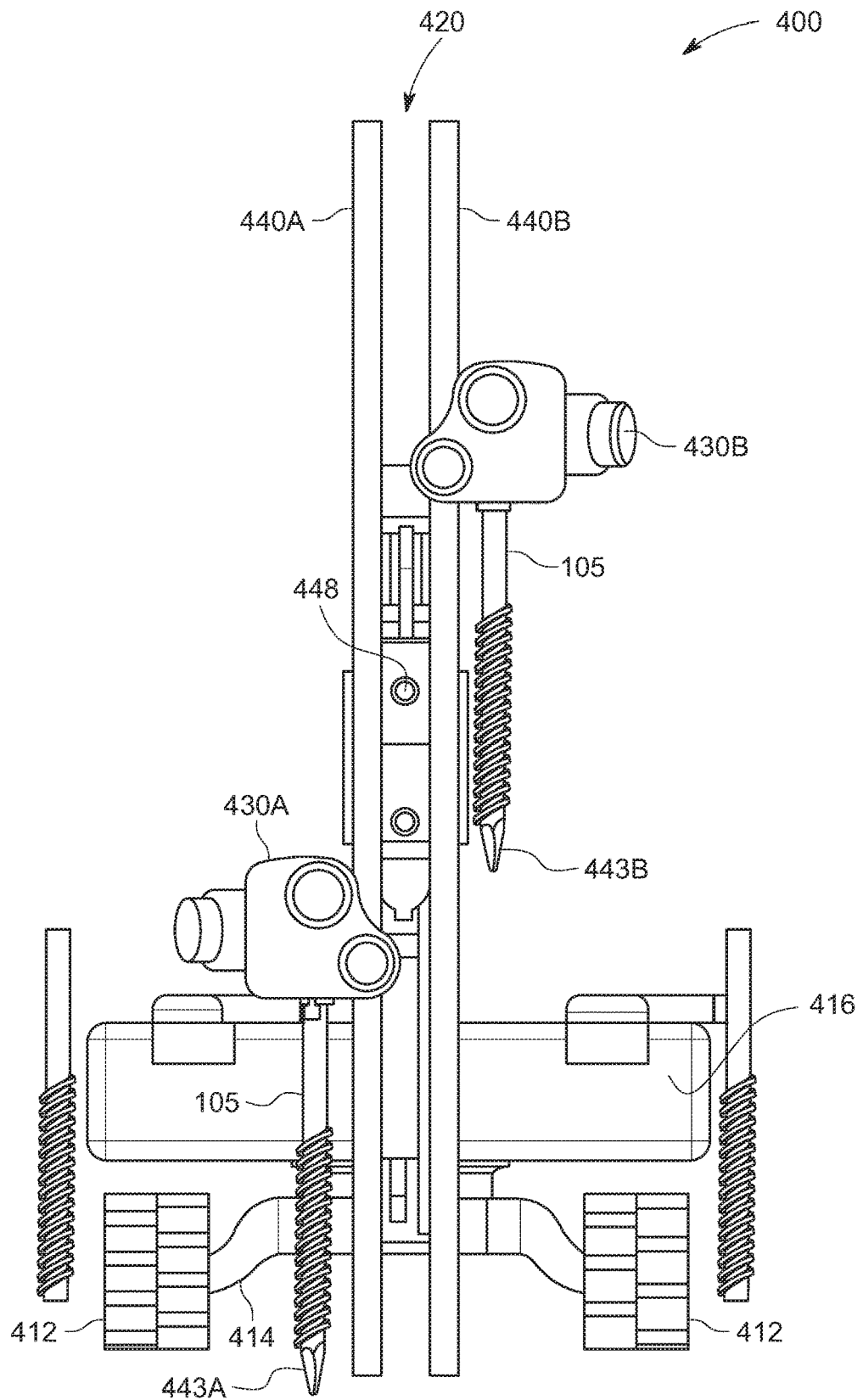
FIG. 7A is a front view of yet another screw anchor driving machine according to various additional embodiments of the invention.
Figure 7B:
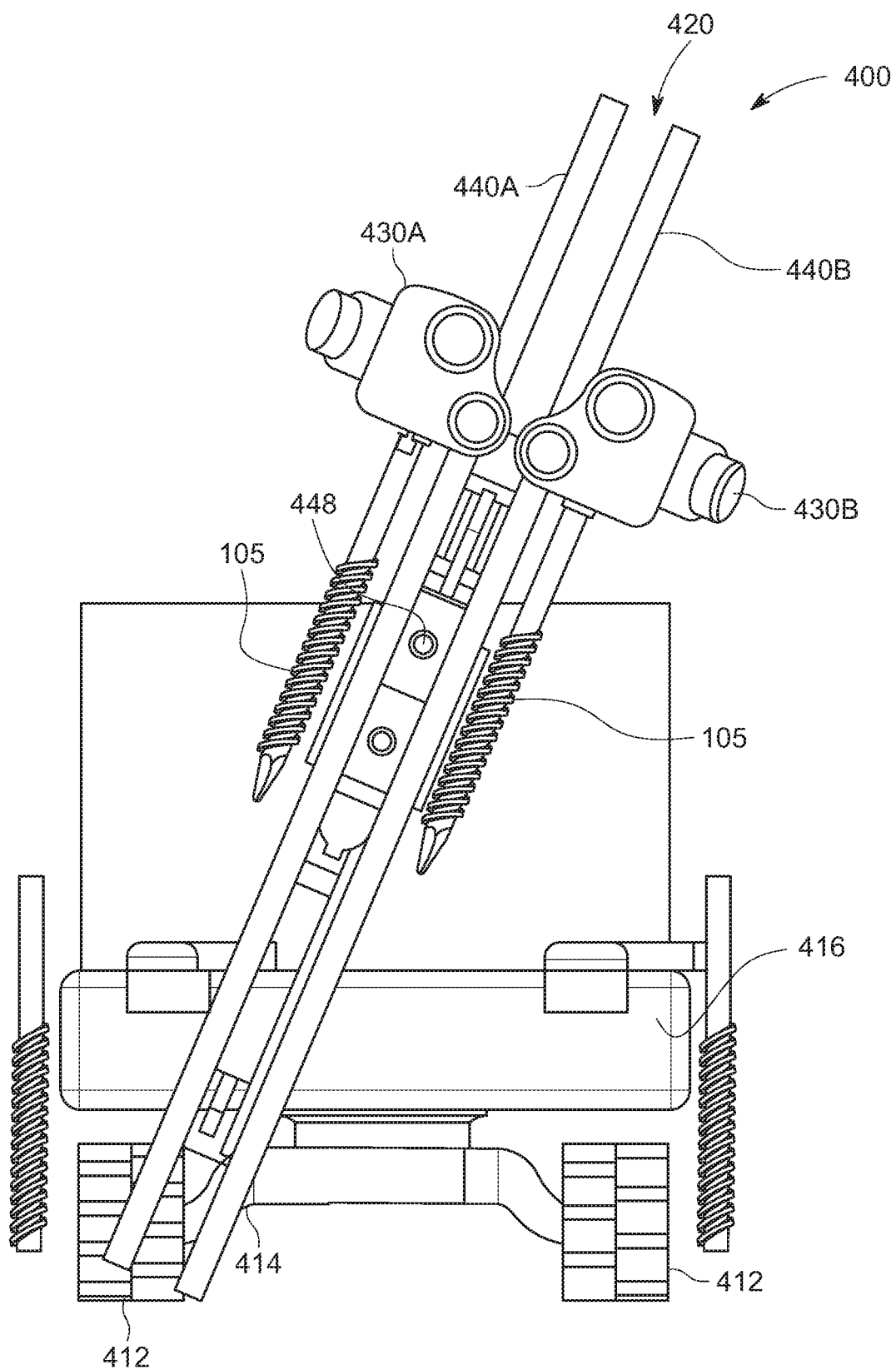
FIG. 7B is a front view of the machine of FIG. 7A, engaged and a screw anchor driving operation.

Depending on how frequently the extended driving assembly must be used relative to both assemblies at the same time on a given job site, it may be desirable and/or necessary to go faster than the serialized process described in the context of the machine shown in FIGS. 5A-B when longer screw anchors are needed most or all the time. To that end, FIGS. 7A-C show another exemplary machine 400 for driving two anchors of regular or extended length in rapid succession according to various embodiments of the invention. The advantage of this exemplary machine 400 over that of FIGS. 6A and B is that it can install two anchors serially without needing to reload between successive drives and both may be extended length. Because the drive arms 440A/B of this exemplary machine are oriented parallel to one other, they never intersect (e.g., occupy the same space at the same time). This eliminates the spatial constraints discussed in the context of other embodiments of two drive assemblies needing to occupy the same space.

Machine 400 shown in FIGS. 7A-B. This machine is similar to those shown in conjunction with the various other embodiments, including a tracked chassis, hydraulic system, and one or more articulating arm that supports mast 420 of a driver attachment. The attachment shown here consists of a pair of parallel frame members 440A/B that moves as an entire assembly relative to base machine 400. Chassis 414 rides on tracks 412 and supports main body portion 416. In various embodiments the connection between mast 420 and main body portion 416 allows the entire attachment assembly to tilt forward and backward (move in pitch) and to telescope towards and away from the chassis (move in yaw), as well as to move rotate about common hinge point 448 (move in roll). Mast 420 may also include a telescoping feature to raise or lower the driving assemblies relative to the ground while remaining in the same plane. Drive assemblies 430A/B travel along their respective frame members 440A/B to allow regular or extended length anchors to be loaded at the same time and then driven serially into the ground. Frame members 440A/B are fixed together at a uniform distance so that they remain parallel regardless of the angular orientation of the attachment and/or frame.

Screw anchors may be loaded onto machine 400 of FIGS. 7A-B in the same manner as in other embodiments. That is, they may be manually slid over respective mandrels 443A/B, attached to the rotary driver of drive assemblies 430AB, or alternatively, loaded with auto loading mechanism that grab an anchor from a cache of anchors and move it into the path of the one of the mandrels so that the mandrel can pass through it until the top of the anchor engage the rotary driver. The exemplary robotic auto loaders 418 shown in FIGS. 8A-C are single-plane loaders that rotate about respective Z-axes. Each loader has a rotating arm that swings outward until it is adjacent to the next available foundation anchor from a supply of available anchors carried by the machine. A claw at the end of the arm closes to grab the shaft of an available screw anchor. The arm rotates back towards its respective driving assembly to transfer the anchor to the driving assembly. In either case, once each drive assembly is loaded, mast 420 is rotated to the first driving so that the first driving assembly 430A can begin driving the first screw anchor into the ground. Once that anchor is driven to the target depth, drive assembly 430A is retracted up frame member 440A, and the mast is rotated until assembly 430B is oriented at the second driving angle. Drive assembly 430B is actuated along frame member 440B to drive the second screw anchor into the ground at the second angle until the target depth is again reached. Assembly 430B is then withdrawn so that the machine can be reloaded and moved to the next installation site along the tracker row or at the beginning of the next row.

Figure 8:
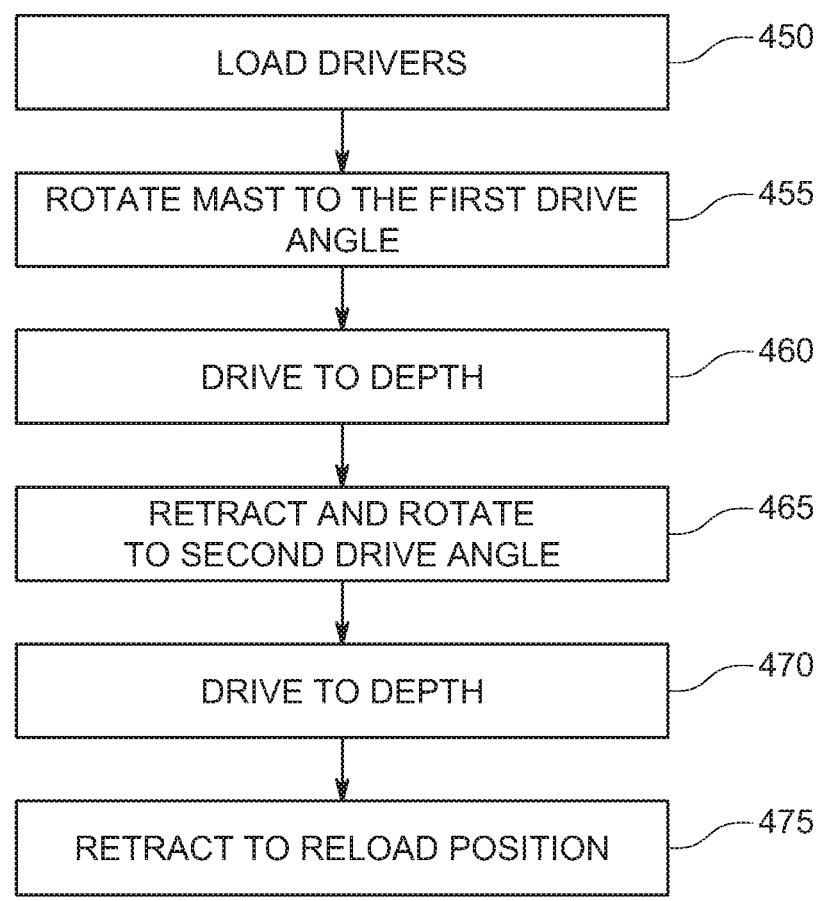
FIG. 8 is a flow chart detailing the steps of a method for driving a pair of adjacent screw anchors with the machine shown in FIGS. 2A-C according to various embodiments of the invention.

FIG. 8 is a flow chart detailing the steps of a method for installing a pair of adjacent screw anchors with machine 400 shown in FIGS. 7A/B. The method begins in step 450 where a pair of screw anchors are loaded onto the respective rotary drivers on the mast of the machine. As discussed above, this may consist of manually sleeving the anchors past the tip of each mandrel until it engages the driving head of one of the rotary drivers. Alternatively an autoloading mechanism may grab an available screw anchor from a supply carried on the machine and move it into position so that the mandrel can be automatically actuated to travel down its frame member, passing through the screw anchor until the top of the anchor engages the driving head of the rotary driver. Then, in step 455, the mast and/or frame members are moved until the first drive assembly is oriented along the intended drive access. In some embodiments, this may simply involve rotating the pair of frame members about a common hinge point, such as point 448 in FIG. 7B. In other embodiments, the machine may move the entire mast in several directions at once to achieve alignment with the desired drive axis. In step 460, the first screw anchor is driven to depth by engaging the axial drive motor, rotary driver and, if necessary, the tool driver to rotate the screw anchor into the supporting ground to the desired depth. In step 465 the first drive assembly is retracted back up its frame member until it clears the driven anchor and the mast and/or frame members are rotated to the second drive angle. In step 470, the second anchor is driven to depth by repeating substantially the same process with the second drive assembly. Once complete, in step 475 the second assembly is withdrawn from the driven anchor so that the machine may be reloaded and positioned at the next foundation location point on the array.

The embodiments of the present invention are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A screw anchor driving attachment comprising:
a first driving assembly; and
a second driving assembly, wherein the first and second driving assemblies are movably attached to at least one common support structure and operable to independently drive respective screw anchors into underlying ground at different angles relative to plumb, wherein each of the first and second driving assemblies comprises a rotary driver and a tool driver movably attached to and movable along respective first and second driving arms and one of the first and second driving arms is substantially longer than the other.

2. The attachment according to claim 1, wherein the first and second driving assemblies are rotatably attached to the at least one common support structure to simultaneously orient the first and second driving assemblies to different driving angles.

3. The attachment according to claim 1, where the first and second driving arms are separated by an acute angle in a substantially common plane to enable adjacent screw anchors to be driven into the ground in overlapping time.

4. The attachment according to claim 1, wherein the first and second drive assemblies are operable to independently drive respective screw anchors into underlying ground at different rates of feed and speed with respect to each other.

5. A screw anchor driving machine comprising:
a motorized body; and
an attachment, movably attached to the body, the attachment comprising:
at least one common support structure movably connected to the motorized body;
a first driving assembly; and
a second driving assembly, wherein the first and second driving assemblies are attached to the least one common support structure and are independently controllable to drive a pair of screw anchors into underlying ground at angles to one another, wherein each of the first and second driving assemblies comprises a rotary driver and a tool driver movably attached to respective first and second driving arms and one of the first and second driving arms is longer than the other.

6. The machine according to claim 5, wherein the first and second driving arms are rotatably attached to the at least one common support structure to simultaneously orient the first and second driving assemblies to different driving angles.

7. The machine according to claim 5, where the first and second driving arms are separated by an acute angle in a substantially common plane to enable adjacent screw anchors to be driven into the ground in overlapping time.

8. A system comprising:
a base machine;
a support structure movably attached to the base machine;
first and second drive assemblies attached to and movable about the support structure, the first and second drive assemblies operable to move independent of each other and the support structure to drive respective screw anchors into underlying ground at angles to one another, wherein each of the first and second drive assemblies comprises a rotary driver and a tool driver movably attached to respective first and second driving arms and one of the first and second driving arms is longer than the other.

9. The system according to claim 8, wherein the first and second driving arms are rotatably attached to the at least one common support structure to orient the first and second drive assemblies to different driving angles.

10. The system according to claim 8, where the first and second driving arms are separated by an acute angle in a substantially common plane to enable adjacent screw anchors to be driven into the ground in overlapping time.

* * * * *